United States Patent [19]

Sala

[11] Patent Number: 5,431,041
[45] Date of Patent: Jul. 11, 1995

[54] APPARATUS FOR TESTING THE SEAL OF WHEEL RIMS FOR CARS AND THE LIKE

[75] Inventor: Fausto Sala, Legnano, Italy

[73] Assignee: Premaq Impex, Inc., Chatsworth, Calif.

[21] Appl. No.: 178,137

[22] Filed: Jan. 6, 1994

[30] Foreign Application Priority Data

Jan. 14, 1993 [IT] Italy .................. MI93A0037

[51] Int. Cl.6 ............................................. G01M 3/24
[52] U.S. Cl. .................... 73/40; 73/40.5 A; 73/49.8
[58] Field of Search .............. 73/40, 49, 49.8, 40.5 A, 73/45.5

[56] References Cited

U.S. PATENT DOCUMENTS

| | | | |
|---|---|---|---|
| 3,266,296 | 8/1966 | Hall | 73/40.5 A |
| 4,416,145 | 11/1983 | Goodman et al. | 73/40.5 A |
| 4,754,638 | 7/1988 | Brayman et al. | 73/40.7 |
| 4,852,390 | 8/1989 | Fisch | 73/40.5 A |
| 4,991,426 | 2/1991 | Evans | 73/40.5 A |
| 5,267,468 | 12/1993 | Zoccoletti et al. | 73/40 |

*Primary Examiner*—Hezron E. Williams
*Assistant Examiner*—Michael J. Brock

[57] ABSTRACT

The apparatus comprises a lower sensor-holder head (40) and an upper sensor-holder head (72) each located at the center of an annular gasket (20, 70). Either (or both) of the sensor-holder heads are received in a space extending along the center axis of the gasket and are axially movable between a retracted position and an extended position. Preferably, one or both of the gaskets has stepped concentric rings for adaptation to different test object diameters. In operation, an object to be tested such as a wheel rim (C) is sealed between an upper gasket and lower gasket to define a space inside the wheel rim which encloses the sensor-holder heads, and to define a space enclosed between the outside of the wheel rim and an airtight bell chamber (66) which is pressurized with air or testing gas. Any leakage through the wheel rim is detected by one or more sensors on the heads.

8 Claims, 4 Drawing Sheets

APPARATUS FOR TESTING THE SEAL OF WHEEL RIMS FOR CARS AND THE LIKE

BACKGROUND OF THE INVENTION

The use of tubeless tires is widespread in the car sector. This kind of tire requires that the wheel rims onto which the said tires are mounted have a perfect pneumatic seal, and therefore requires careful verification of the wheel rims to discover any possible faults in construction which could compromise the maintaining of the pressure in the tires themselves. In particular, wheel rims cast in light alloys (aluminium and/or magnesium alloys) are subject to microporosity or microfissure.

Various systems are known for checking wheel rims. According to one known system the compactedness of the rim structure is tested by means of X rays; such a system is able to detect microfissures in the product, but is not able to verify whether such microfissures cause a defect in the seal.

A second known system comprise a sealing check by means of water, air or testing gas.

However, in such a system, checks are somewhat subjective. In addition, such a technique requires long checking times and therefore contributes to high production costs. U.S. Pat. No. 4,416,145 describes an apparatus and a method for detecting leakages in a container by applying gas under pressure to one of the container walls; the gas passes through any possible openings in the wall and causes bubbles in a high-surface tension liquid applied, causing the bubbles to burst, and makes ultrasounds; these are detected by an ultrasound transducer. Such patent, however, does not suggest using the present method for checking wheel rims and does not give any useful teaching concerning the present apparatus for checking wheel rims.

SUMMARY OF THE INVENTION

The object of this invention is to realize an apparatus capable of testing vehicle wheel rims in order to check whether they are permeable to air or not.

Such object has been achieved by means of an apparatus as defined in the claims.

The apparatus of the present invention comprises a base structure having four sides. The upper surface of the base structure houses equipment for supporting the wheel rim to be tested and, near the corners of the four sides, there are provided anchorages for support columns for an upper structure. Inside the base structure, in its central part, a device bears a head with electrical checking sensors, which head is movable between a retracted rest position and an extended working position. The movement of this device is obtained by means of a pneumatic or hydraulic cylinder, or alternatively by means of a ballscrew with a related electrical driving and control motor. The upper structure supported by the columns is composed of a fixed part and a movable part comprising a sealing bell chamber and a device for locking the wheel rim. The wheel rim is positioned on a gasket on the lower equipment or structure, and the movable part above is lowered onto it. The bell chamber acts to insulate the wheel rim hermetically from everything around it in such a way that air can be sent into the air space created between the outer face of the wheel rim and the inner face of the bell chamber, with or without additives. Sealing is carried out axially to the wheel rim by the locking device, which by compressing the wheel rim onto the outer edges obtains the airtight chamber which allows air or testing gas to be sent in. The above sealed condition is achieved by appropriate gaskets, suitable for wheel rims of all sizes, which press against the outer edges of the wheel rims themselves; one gasket is fixed onto the upper surface of the base structure and the other onto the lower part of the locking device; both can be replaced easily and quickly. The locking device or frame bears the other sensor holder head, which is positioned in the upper part of the wheel rim with respect to the splining hub, or in correspondence with the sort of the wheel rim on view. The data detected by the sensor unit can be displayed on an electrical panel of the machine. The discrimination between good wheel rims and wheel rims to be rejected is automatic.

The new apparatus allows to check the sealing of wheel rims easily, quickly and safely; therefore it helps to keep down production costs of the wheel rims themselves. Obviously, it can be used for annular bodies other than wheel rims.

BRIEF DESCRIPTION OF THE DRAWINGS

Embodiments of the invention will be described below with reference to the appended drawings are given by way of illustration only, and thus are not limitative of the present invention and wherein.

DESCRIPTION OF PREFERRED EMBODIMENTS

Figure 1:
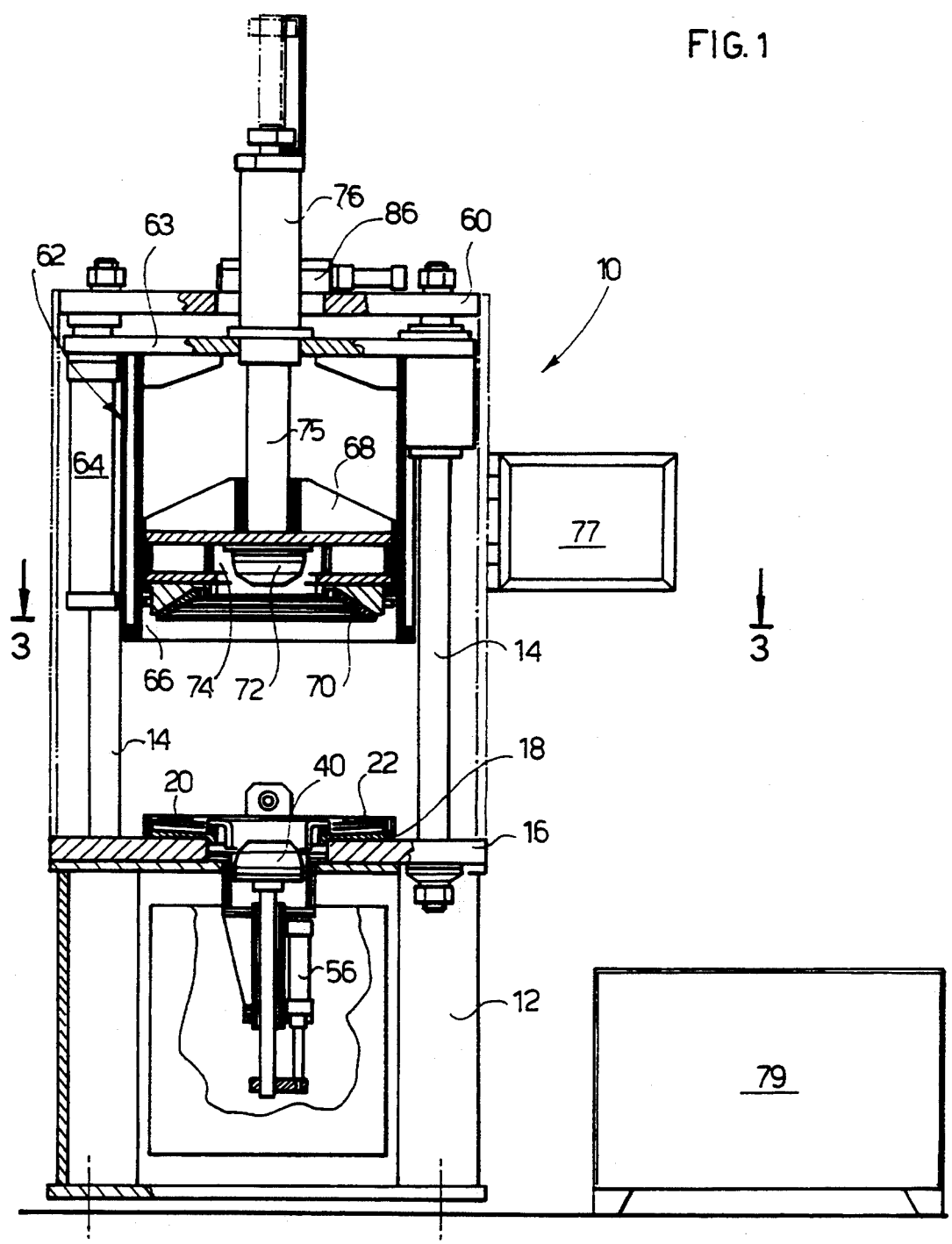
FIG. 1 is a sectional diagram of a front part of a first embodiment of the apparatus.

With reference to the figures, the apparatus as a whole is shown with reference numeral 10. It comprises a fixed framework comprising a base structure 12 and columns 14 (obviously any number of them; they could be substituted by a single upright).

The upper surface 16 of the base bears a first wheel rim support and sealing device, which essentially comprises an annular plate 18, on which is positioned an annular gasket 20 of flexible, elastic material. Preferably but not necessarily, an annular sheath 22 of flexible material is integral with the plate 18 along the outer edge of the plate and is L-shaped radially, so that its upper limb extends towards the centre of the ring to cover the gasket 20 at least partially. The function of the sheath 22, if employed, is to keep out any washing fluid of the gasket. On the outside of the plate 18 the mouth 26 of a pipe 28 is employed for gas under pressure; while a further pipe 30 for washing fluid opens into the gap defined between the sheath 22, the plate 18 and the gasket 20, Along the vertical axis passing through the centre of the concentric rings of a plate 18 and of gasket 20, a substantially cylindrical housing 32 is defined. The housing 32 is defined by an upper sleeve 34, which has an upper radial wing fixed to the plate 18, by means of screws for example, and a lower sleeve 36 welded to a locking ring 37, which in turn is screwed to the structure 12 by means of screws 38.

The housing 32 receives a sensor holder head 40 movable between a rest position, (drawn with dots and dashes) in which it is retracted inside the housing 32, and an extended work position, (drawn with an unbroken line) in which it protrudes at least partially above the level of the gasket 20.

The sensor-holder head preferably comprises a base 42 and a cap 44 fixed to the base 42; the cam bears a number of sensors 46, suitable for detecting an air or gas leak, and the related electrical connections (not shown). In one preferred embodiment the sensors are ultrasound sensors according to the U.S. Pat. No. 4,416,145.

The head 40 is mounted on a hollow shaft 48 sliding in a vertical guide 50. The bottom end of the shaft 48 is retained by means of an arm 52 to a shaft 54 of a piston-cylinder drive unit 56, whose cylinder is fixed to the guide 50. The piston-cylinder 56 therefore moves the head between a retracted position and an extended position. Obviously it is possible to obtain such movement with other known means, for example, a ballscrew device (not shown).

A fixed upper plate 60 is carried on the columns 14 and a movable part 62 is able to slide vertically on said columns. The vertical movement of the part 62 with respect to 60 is realized, for example, by one or more lateral piston-cylinder units 64. Obviously, however, many modifications are possible within the competence of one skilled in the art.

The movable plate 63 of the movable part 62 bears a bell chamber 66 extending downwards and open at the bottom, having a lower gasket 67. In the space inside the bell chamber a second support and sealing device is received and is vertically movable consisting of a locking frame 68 with piston, which bears an upper sealing gasket 70 and an upper sensor holder head 72.

The upper gasket 70 is preferably toric and frustoconical, with a stepped inner surface, and is fixed to a frustoconical surface of the structure.

The head 72 is received in a fixed way in a space 74 of the structure. It is integral with a hollow guiding shaft 75, sliding in a guiding sleeve 76 fixed to the fixed structure 12.

The upper head 72 is provided with sensors 46 like the lower head 40, and the electrical connections of these pass along the hollow shaft.

Four radial cylinders 58 (not shown in FIG. 1) on the lower fixed structure act to lock the bell chamber tight in the lowered position. A safety device 86 fixes the raised position of the movable part securely.

Reference numeral 77 is a push-button panel for driving and controlling the machine; reference numeral 79 is a hydraulic gearbox for driving the hydraulic members.

Figure 2:
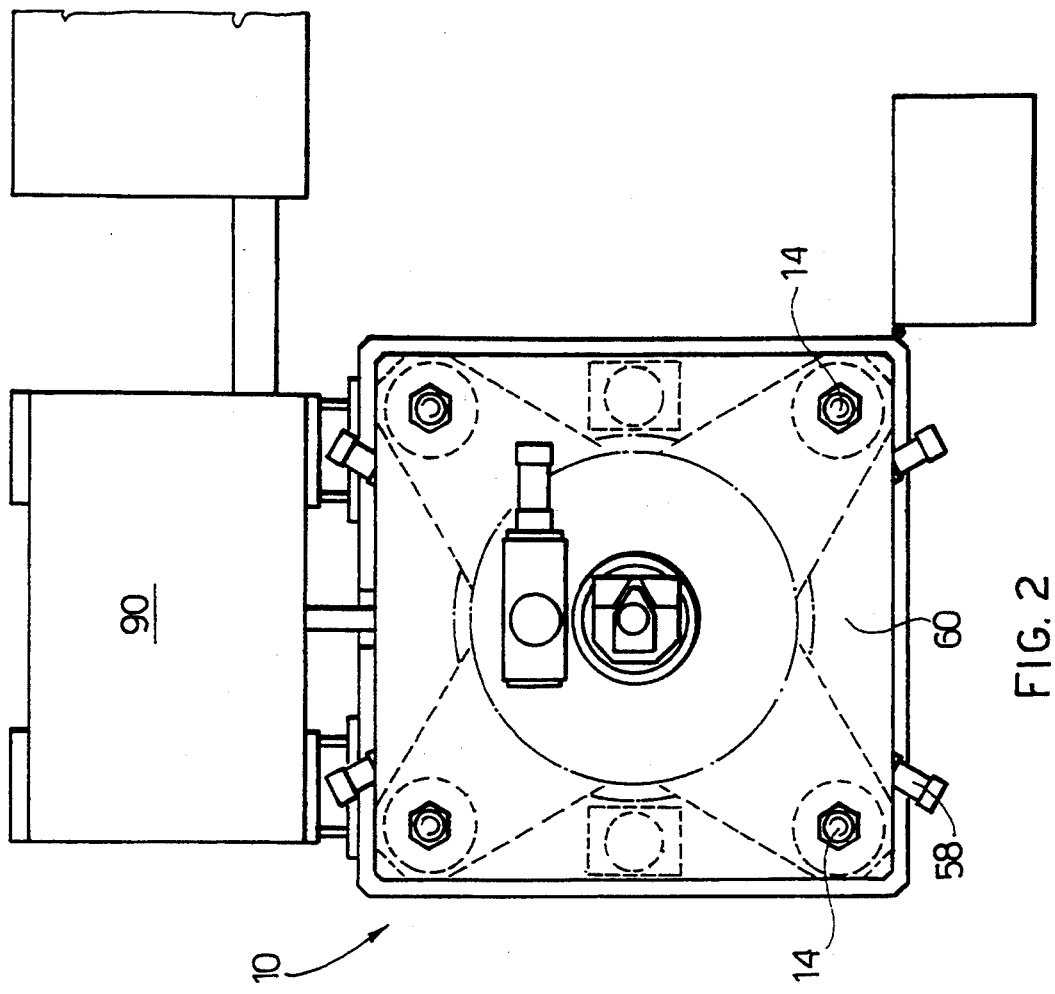
FIG. 2 is a top view of the apparatus.
Figure 3:
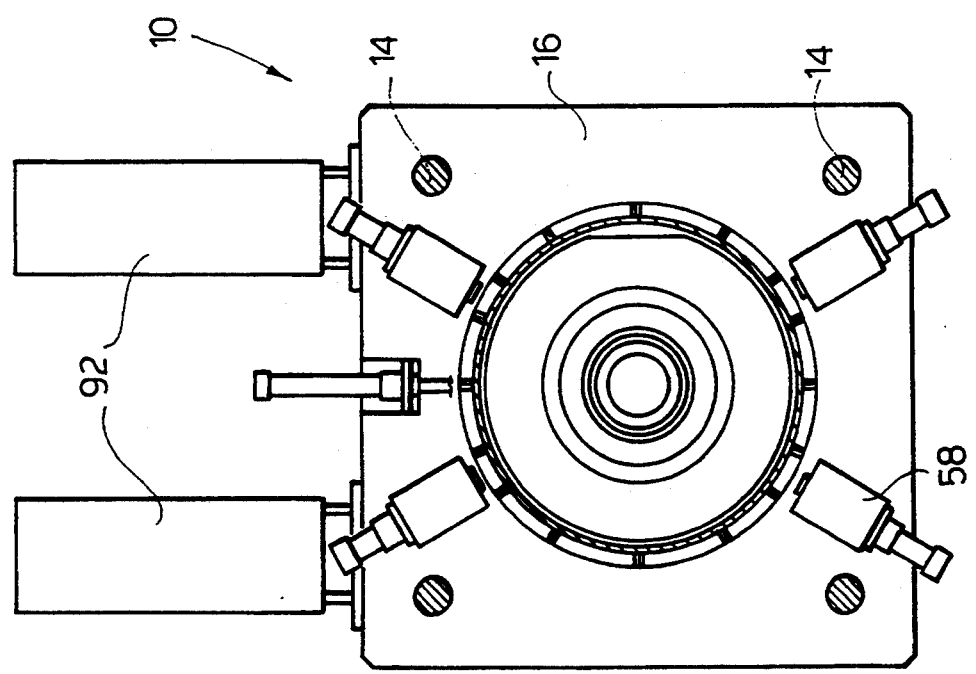
FIG. 3 is a horizontal sectional view taken along line 3—3 in FIG. 1.

The electrical compartment 90 and its support arms 92 can be seen in FIGS. 2 and 3.

Figure 4:
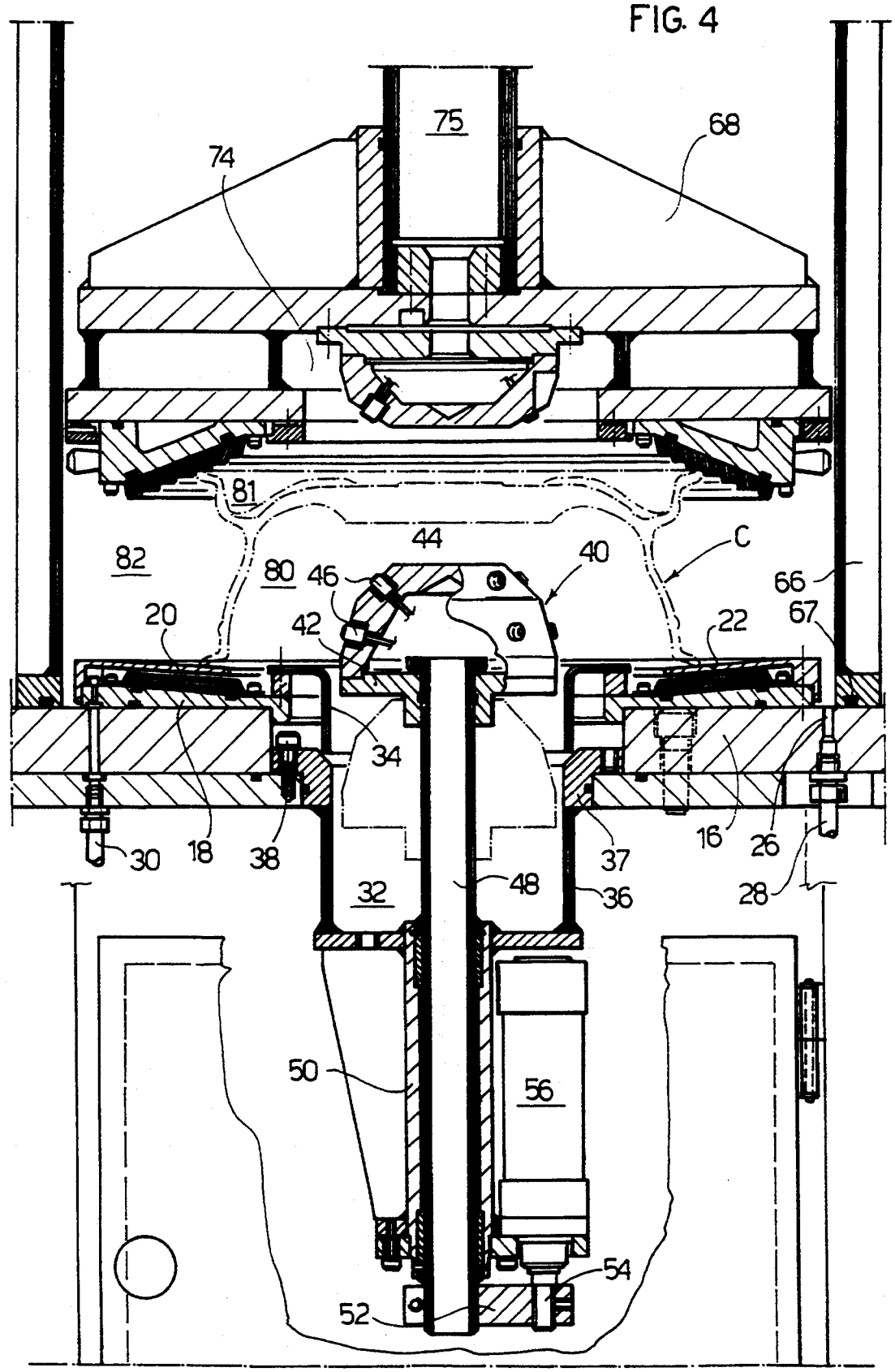
FIG. 4 is an illustration of the apparatus in vertical axial sectional view, enlarged with respect to the previous figures; the apparatus is illustrated in the working position in which it is testing the seal of a wheel rim (the rim is drawn with dots and dashes)

A brief explanation is given below of the operation of the apparatus. With the plate 63 raised (position in FIG. 1) and the lower head 40 retracted, the tire rim C to be tested is positioned on the lower gasket 20 (or on the sheath 22 employed). Then the upper structure is lowered until the upper stepped gasket rests against the upper edge of the wheel rim, effecting the sealing of the said upper edge against the said gasket and of the lower edge against the lower gasket. The run of the bell chamber 66 extends until it effects the seal against the lower plate 16. This situation is illustrated in FIG. 4. At this point an airtight chamber 80 is formed inside the wheel rim (or two inner chambers 80, 81, if the centre of the wheel rim is solid) and an airtight chamber 82 is formed between the wheel rim and the bell chamber. Then air or other gas is sent into the chamber 82. Any possible gas leakage through the circular wall of the wheel rim will be detected by the sensors 46 of the heads 47 and 72 and signalled in any appropriate manner.

Figure 5:
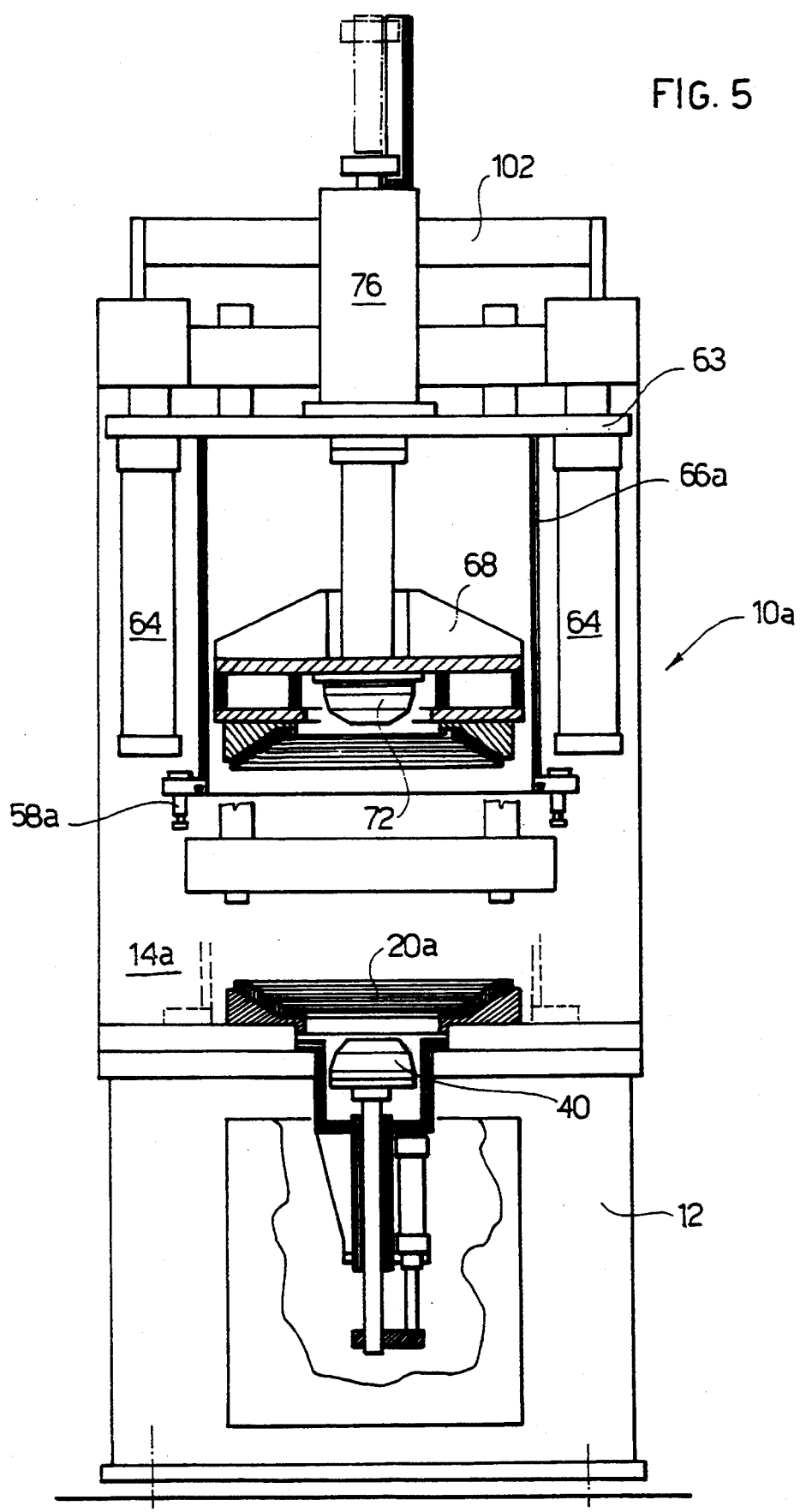
FIG. 5 is an illustration similar to FIG. 1, of an modified embodiment of the apparatus.

A preferred embodiment 10a of the apparatus is illustrated in FIG. 5. In it the same reference numerals indicate the same elements as those of the previous embodiment, and therefore will not be described. The apparatus 10a comprises an upright 14a, which supports columns for guiding the movement of the bell chamber 66a; desired, at the bottom there are provided known centering and clamping devices 58a.

The apparatus 10a in FIG. 5 has a lower, annular frustoconical shaped gasket 20a realized with steps like the upper gasket 70 and without a sheath.

Obviously, variations and modifications can be made to what has been described; for example, the bell chamber could be integral with the lower part instead of with the upper part. It is understood that such modifications as within the competence of one skilled in the art are intended to be included within the scope of the following claims.

What is claimed is:

1. An apparatus for testing the seal of an annular body, for example a wheel rim, said apparatus comprising:
    a first sealing device provided with a first annular gasket for making sealing contact with said annular body to be tested;
    a second sealing device provided with a second annular gasket for making sealing contact with the annular body to be tested;
    a bell chamber, movable between an open position and a closed position for sealing off a space suitable for receiving the annular body;
    intake means for a supplying pressurized gas into said space;
    a first sensor-holder head disposed inside the annular body to be tested;
    said first sensor-holder head being received into an aperture extending along an axis passing through the center of a ring defined by the first gasket and being axially movable between a retracted position inside said aperture and an extended position wherein the first sensor-holder head projects beyond the level of said first gasket.

2. The apparatus according to claim 1, characterized in that said apparatus comprises a second sensor-holder head coaxial with the said bell chamber and axially movable in relation to said bell chamber.

3. The apparatus according to claim 2, characterized in that the second sensor-holder head is carried on a head-holder frame contained in the space defined by said bell chamber.

4. The apparatus according to claim 1, characterized in that at least one of said first and second annular gaskets has an annular frusto-conical shape with a sealing surface thereof having concentric steps.

5. An apparatus for testing the seal of an annular body, for example a wheel rim, said apparatus comprising:
    a first sealing device provided with a first annular gasket for making sealing contact with said annular body to be tested;

a second sealing device provided with a second annular gasket for making sealing contact with the annular body to be tested;

a bell chamber, movable between an open position and a closed position for sealing off a space suitable for receiving the annular body;

intake means for a supplying pressurized gas into said space;

a first sensor-holder head disposed inside the annular body to be tested;

a second sensor-holder head disposed inside the annular body to be tested and axially movable in relation to said bell chamber.

6. The apparatus according to claim 5, characterized in that the second sensor-holder head is carried on a head-holder frame contained in a space defined by said bell chamber.

7. The apparatus according to claim 5, characterized in that at least one of the said first and second annular gaskets has an annular frusto-conical shape with a sealing surface having concentric steps.

8. An apparatus for testing the seal of an annular body, for example-a wheel rim, said apparatus comprising:

a first sealing device provided with a first annular gasket for making sealing contact with said annular body to be tested;

a second sealing device provided with a second annular gasket for making sealing contact with the annular body to be tested;

a bell chamber, movable between an open position and a closed position for sealing off a space suitable for receiving the annular body;

intake means for a supplying pressurized gas into said space;

at least one sensor-holder head disposed inside the annular body to be tested; and wherein at least one of said first and second annular gaskets has a frusto-conical shape with a sealing surface thereof having concentric steps.

* * * * *